United States Patent [19]
Harder, Jr.

[11] 4,077,664
[45] Mar. 7, 1978

[54] SEAT WITH CUSHIONED GRAB BAR

[75] Inventor: Arthur J. Harder, Jr., Franklin Park, Ill.

[73] Assignee: Coach and Car Equipment Corporation, Elk Grove Village, Ill.

[21] Appl. No.: 708,483

[22] Filed: Jul. 26, 1976

Related U.S. Application Data

[63] Continuation-in-part of Ser. No. 533,253, Dec. 16, 1974, Pat. No. 4,042,663.

[51] Int. Cl.² .............................................. A47C 4/52
[52] U.S. Cl. .................................. 297/183; 16/116 R
[58] Field of Search ............ 297/183; 16/119, 116 A, 16/116 R, 124

[56] References Cited

U.S. PATENT DOCUMENTS

| 793,863 | 7/1905 | Vogel | 297/183 |
|---|---|---|---|
| 1,462,125 | 7/1923 | Rissmann | 297/183 X |
| 2,600,902 | 6/1952 | Messerschmidt | 16/119 |
| 2,621,043 | 12/1952 | Olmstead | 16/116 R |
| 3,145,050 | 8/1964 | Edwards | 297/183 |
| 3,747,978 | 7/1973 | Barecki | 297/183 |
| 3,813,729 | 6/1974 | Szabo | 16/119 |
| 3,915,782 | 10/1975 | Davis | 16/116 R |
| 3,951,454 | 4/1976 | Tantlinger | 297/183 X |

FOREIGN PATENT DOCUMENTS

| 899,001 | 12/1953 | Germany | 297/183 |
|---|---|---|---|
| 895,371 | 5/1962 | United Kingdom | 297/183 |

*Primary Examiner*—James T. McCall
*Attorney, Agent, or Firm*—Merriam, Marshall & Bicknell

[57] ABSTRACT

A seat for a mass transit vehicle such as a bus. The seat has a cushioned grab bar at the top of the seat back. The grab bar comprises a round inner tubular member of steel and an outer layer of resilient cushioning material such as polyvinyl chloride integrally bonded to the inner member to prevent slippage of the outer layer relative to the inner member. Where the grab bar is joined to the seat, any exposed edges on the frame or shell of the seat are covered by the cushioning material of the grab bar.

6 Claims, 10 Drawing Figures

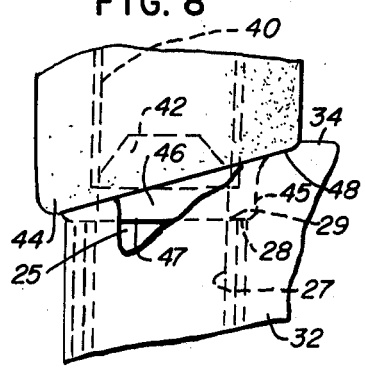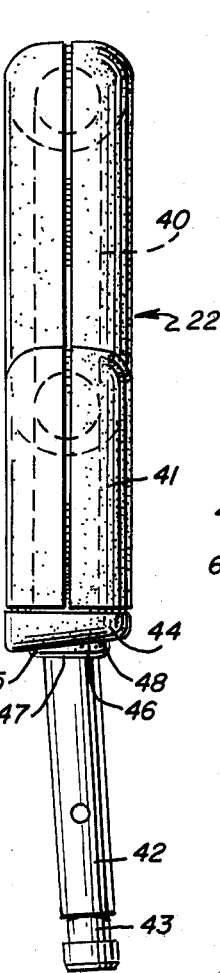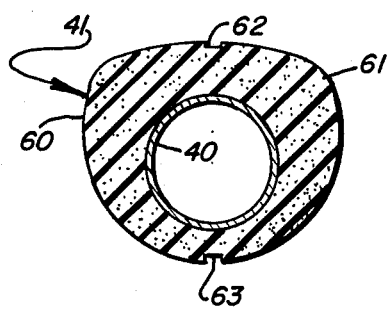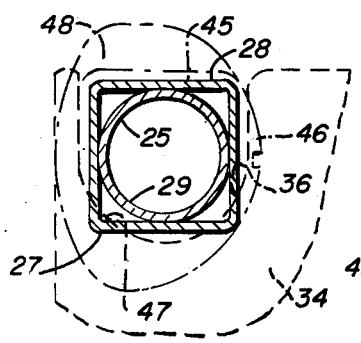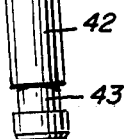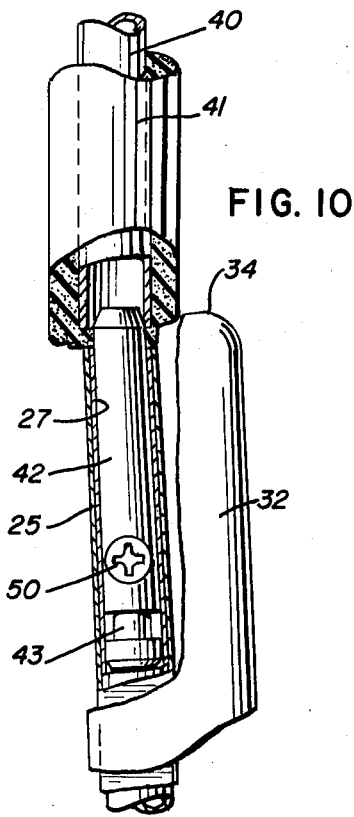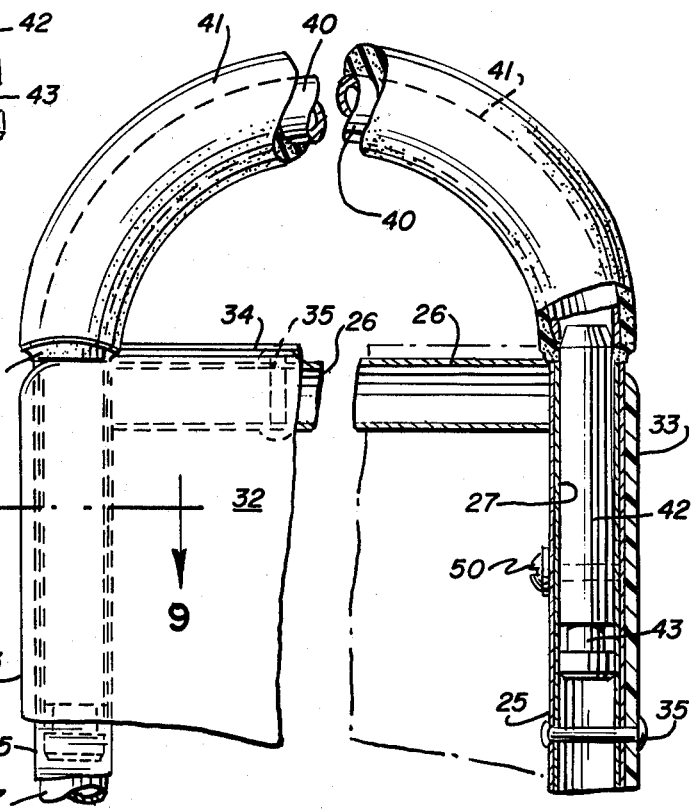

SEAT WITH CUSHIONED GRAB BAR

RELATED APPLICATION

This is a continuation-in-part of application Ser. No. 533,253 filed Dec. 16, 1974 and entitled "Monolithic Seat Cushion and Process for Producing Same" now U.S. Pat. No. 4,042,663.

BACKGROUND OF THE INVENTION

The present invention relates generally to a seat for mass transit vehicles such as buses or subway cars, and more particularly to seats of this type having grab bars extending upwardly from the top of the seat back.

Conventionally, these grab bars have been made of steel tubing. A mass transit vehicle, like any other vehicle, may have to stop suddenly, or may lurch forward, causing the occupant of a seat in the vehicle to be propelled forwardly and downwardly from the waist in such a manner as to strike his head or other parts of his body on the grab bar of the seat in front of him.

To overcome this problem, cushioned grab bars have been proposed. Typically, a cushioned grab bar comprises a metallic, tubular inner member covered with an outer layer of resilient cushioning material such as polyvinyl chloride plastic, of suitable softness and impact resistance.

The areas of the grab bar where impact by the head of a seat occupant is most likely are the back and top or outside of the grab bar, with the least likely area of impact being the bottom or inside of the grab bar. Accordingly, the resilient cushioning material should be thicker at the areas where impact is most likely and relatively thin at the areas where impact would not occur.

Problems arise in maintaining the outer layer of resilient cushioning material in proper peripheral registry with the inner tubular member so that the relatively thicker parts of the cushioning layer are maintained at the areas where impact is most likely. Absent a proper bond between the two, there may be slippage of the outer layer of resilient cushioning material relative to the inner tubular member. One approach to this problem is to provide an inner tubular member having a rectangular cross-section and an extruded outer tube of resilient cushioning material also having a rectangular cross-section and to slide the outer tube over the rectangular inner tubular member. A drawback to this approach is that rectangular steel tubular members are relatively expensive compared to round steel tubular members.

Another conceivable approach is to use a round tubular inner member, apply adhesive to the outside of it and then try to slide an extruded tubular layer of resilient cushioning material over the round tubular inner member. However, it is difficult to fit an outer extruded layer of resilient material over an inner tubular member when the latter was adhesive applied to it. The adhesive is setting or curing all the while the fitting operation is in progress, and this impedes the fitting operation as well as a proper peripheral registry of the outer layer relative to the round inner member, or else the fitting operation impedes the curing of the adhesive so that a proper bond is not obtained.

Another consideration arises in connection with the manner in which the grab bar is assembled to the seat. The seat usually comprises a tubular back frame having a pair of upstanding tubular side rails connected by a top back rail. A plastic shell is attached to the back frame, with a flange extending from the shell and overlapping the top back rail. The upstanding side rails are open at their top ends to receive terminal parts of the grab bar. The top flange on the plastic shell has a cut away portion to accommodate the grab bar where it enters the upstanding side rail of the seat frame. Thus, the side rails of the seat frame, the plastic seat shell, and the cushioned grab bar all come together at a pair of locations on the seat back. At these locations, there can be exposed edges of the plastic shell's cut away portion, or of the tubular side rails at their upper open ends. Exposed edges are undesirable from an aesthetic standpoint and also because a seat occupant can catch and tear his clothing on the exposed edges of the side rails. One approach to resolving this problem is to grind or polish or otherwise smooth or round the exposed edges, but this is relatively expensive.

SUMMARY OF THE INVENTION

The present invention relates to a seat having a cushioned grab bar comprising a round tubular inner member covered with an outer layer of resilient cushioning material which is maintained in proper peripheral registry with the round inner tubular frame member and in which the outer layer of resilient cushioning material is resistant to being peeled away from the inner tubular frame member by vandals.

The outer layer is typically composed of rubber molded around the inner member or of a resilient plastic cushioning material, such as polyvinyl chloride, which is injection or otherwise molded about the inner tubular frame member to integrally bond the outer layer to the inner member and maintain the two in the proper peripheral registry. In a preferred embodiment, an adhesive bonding agent is applied to the inner tubular member before the injection molding operation, and this further enhances the integral bond between the outer layer of resilient cushioning material and the inner tubular frame member.

The cushioned grab bar has end portions which abut the seat back. These end portions cooperate with the open upper ends of the upstanding side rails and with the cutaway portion on the flange of the plastic seat shell in such a manner as to minimize exposed edges on the seat shell and on the open upper ends of the side rails, thereby eliminating the expensive mechanical operations required to smooth down these edges.

Other features and advantages are inherent in the structure claimed and disclosed or will become apparent to those skilled in the art from the following detailed description in conjunction with the accompanying diagrammatic drawing.

BRIEF DESCRIPTION OF THE DRAWING

FIG. 3 is an elevational view of the cushioned grab bar;

FIG. 4 is a sectional view taken along lines 4—4 in FIG. 2;

FIG. 5 is an end view taken along line 5—5 in FIG. 2;

FIG. 6 is a fragmentary front view of the seat back and cushioned grab bar;

FIG. 7 is a fragmentary rear view, partially in section and partially in phantom of the seat back and cushioned grab bar;

FIG. 8 is a fragmentary side view, partially cut away, of the junction of the cushioned grab bar, tubular seat frame and plastic seat shell;

FIG. 9 is a sectional view, partially in phantom, taken along line 9—9 in FIG. 6; and FIG. 10 is a fragmentary view, partially in section, illustrating the junction of the cushioned grab bar, tubular seat frame and plastic seat shell.

DETAILED DESCRIPTION

Figure 1:
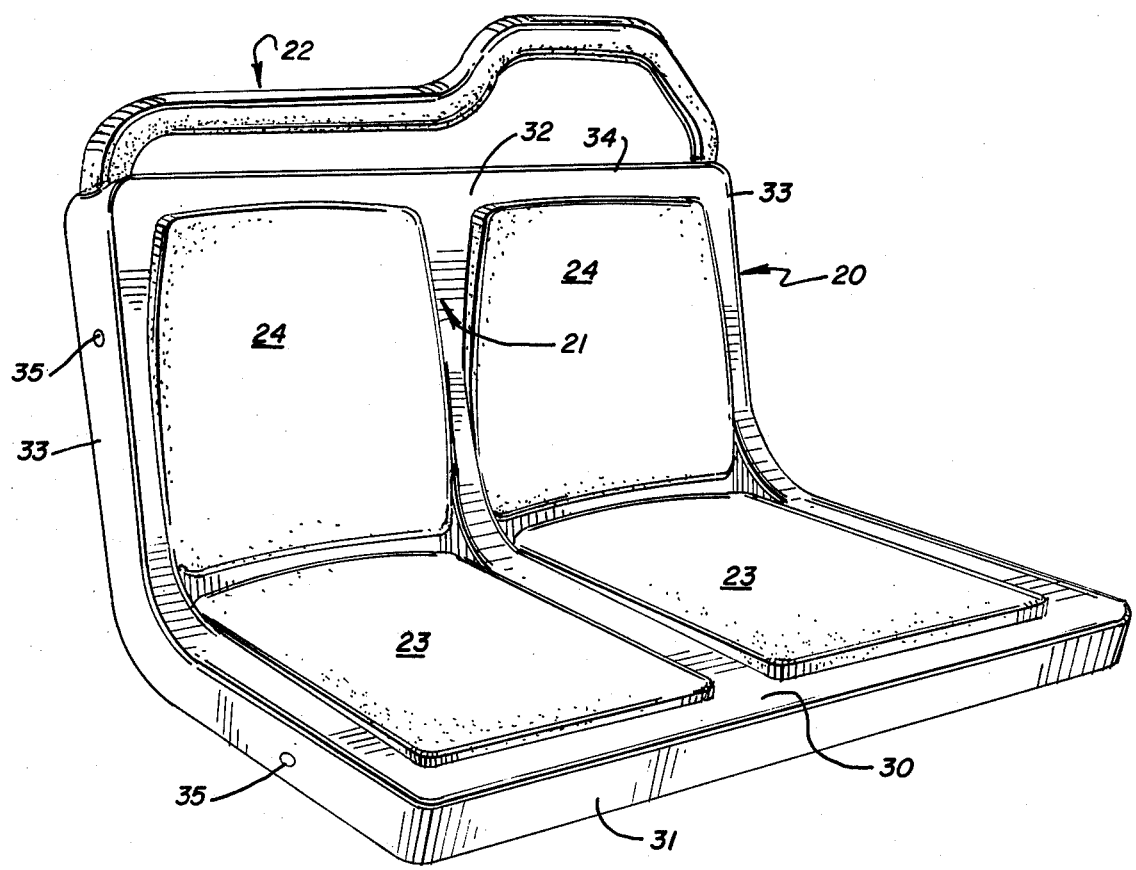
FIG. 1 is a perspective of a seat having a cushioned grab bar in accordance with an embodiment of the present invention.

Referring initially to FIG. 1, illustrated generally at 20 is a seat having a rigid plastic seat shell 21 mounted on a seat frame (not shown in FIG. 1) and a cushioned grab bar 22 mounted on the top of the seat back. Mounted on shell 21 are padded seat inserts 23, 23 and padded back inserts 24, 24.

Plastic seat shell 21 comprises a seat portion 30 having a peripheral depending flange 31 and a back portion 32 having a pair of side flanges 33, 33 and a top flange 34 extending rearwardly from back portion 32 and overlying the top back rail 26 of the seat frame. (FIGS. 6-7). Top back rail 26 extends between a pair of vertically disposed tubular side rails 25, 25 (only one of which is shown in FIGS. 6-10) of the seat frame. Seat shell side flanges 33, 33 and top flange 34 are attached to side rails 25, 25 and back rail 26 of the seat frame, respectively, by fasteners 35 (FIGS. 1 and 6-7).

Referring to FIGS. 6-10, each vertical side rail 25 has a rectangular cross-section in the illustrated embodiment, and, fixed at the upper end portion of each vertical side rail 25 is a round tubular sleeve 27. Both tubular side rail 25 and tubular sleeve 27 terminate at upper open ends defined by edges 28, 29 respectively (FIGS. 8-9).

Figure 2:
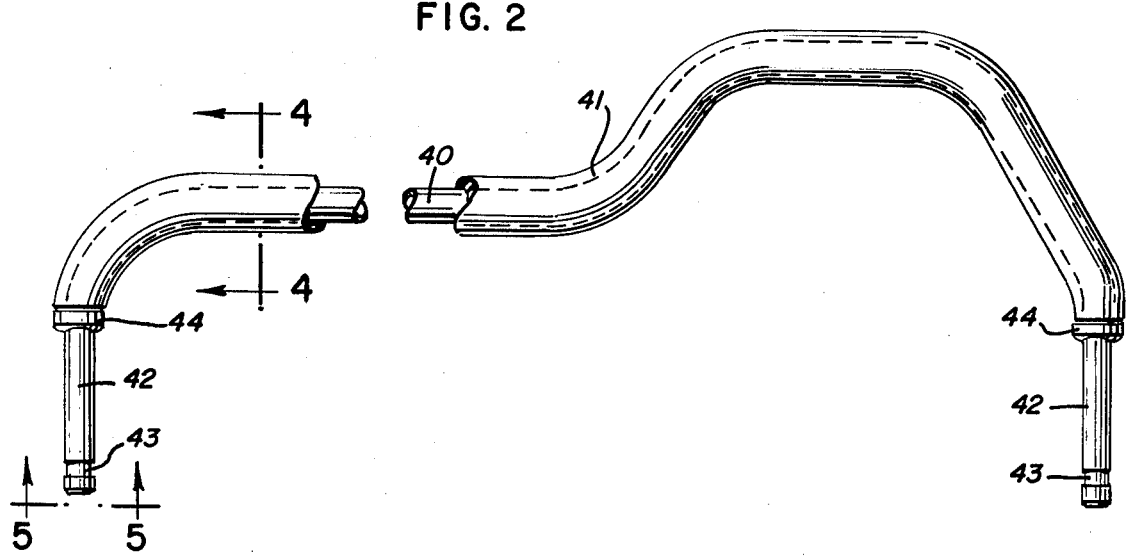
FIG. 2 is a front view of the cushioned grab bar.

Referring to FIGS. 2 and 3, cushioned grab bar 22 comprises a round, metal tubular inner member 40 shaped to a predetermined longitudinal configuration. Enclosing inner tubular member 40 is an annular outer layer of resilient cushioning material 41 extending substantially coextensively with tubular member 40 and having an end portion 44 at each end of the cushioned grab bar. Also located at each end of the grab bar is a terminal part 42 extending integrally from inner tubular member 40 and having a necked down portion 43 engageable to prevent axial movement by inner tubular member 40. As shown in the drawing, the tubular inner member 40 has a longitudinally uniform, round cross-section between its terminal parts 42, 42, and the tubular inner member is unfilled and imperforate between its terminal parts.

End portion 44 on the outer layer of resilient cushioning material is indented at 45, relative to the remainder of the outer layer. Extending axially from end portion 44, at indentation 45, is an appendage 46 having a lower surface 47.

Grab bar 22 is assembled to the seat frame by inserting terminal parts 42, 42 into the round tubular sleeves 27 at the upper end portion of each of vertical side rails 25. When thus assembled, the lower surface 47 on grab bar appendage 46 abuts against the raw, top edges 28, 29 at the open ends of vertical side rail 25 and sleeve 27, covering edges 28, 29, blocking them from view, and preventing snagging or tearing of a passenger's clothing on these raw edges. This construction avoids having to smooth down raw edges 28, 29.

The grab bar and frame are maintained in the assembled relation described in the preceding paragraph by a fastener 50 (FIGS. 7 and 10) passing through vertical side rail 25, sleeve 27 and terminal part 42 of the cushioned grab bar.

Plastic seat shell 21 is assembled to the seat frame before the grab bar. To accommodate the grab bar, top flange 34 of the seat shell 21 has a cut away portion defined by an edge 36 (FIG. 8). Edge 36 is received in indentation 45 at end portion 44 on the cushioned grab bar, and the lower surface 48 of end portion 44 lying just above indentation 45 overlies and covers edge 36.

Outer layer 41 of the cushioned grab bar may have a round cross-section of uniform thickness. Preferably, as shown in FIGS. 4 and 5, outer layer 41 has an irregular cross-section varying in thickness. The front side 60, rear side 61 and top or outside 62 of the outer layer are relatively thick while the bottom or inside 63 is relatively thin. The thickest parts of the outer layer are at those locations most susceptible to impact by a person sitting in a seat located directly behind the seat containing that grab bar or during abrupt changes of movement of the vehicle. Similarly, the thinnest part of the outer layer is at the location least susceptible to that kind of impact. It is important that the outer layer and the inner tubular member be maintained in the predetermined peripheral registry illustrated in FIGS. 4 and 5.

In accordance with the present invention, maintenance of that predetermined peripheral registry is accomplished by integrally bonding the outer layer to the inner tubular member. As used in this application, the words "integrally bonding" or the like, refer to a bond obtained during a manufacturing operation in which the outer layer is molded or cast about the inner tubular member, and excludes a situation in which the outer member is adhered to the inner layer by an adhesive or cement of some kind applied to the inner tubular member after the outer layer has been pre-formed. This would exclude a situation in which the outer layer was first extruded to its final shape and then fitted around the inner tubular member, as by sliding it over the inner tubular member after cement has been applied to the inner tubular member.

As previously noted, in accordance with an embodiment of the present invention the outer layer of resilient cushioning material is typically composed of polyvinyl chloride which has been injection molded around the inner tubular member. During the injection molding operation, each terminal part 42 of the tubular inner member 40 projects outwardly from the injection casting mold, and the necked down portion 43 of terminal part 42 is engaged by clamping means (not shown) to prevent axial movement by the inner tubular member during the injection molding operation.

The injection molding operation is esentially conventional and comprises heating a granulated powder of the polyvinyl chloride plastic to soften the powder and then forcing the plastic, in a semifluid condition, into the cavity of a two-piece mold within which inner tubular member 40 is held in place by pins or the like. The two pieces of the mold are held together during the injection operation but may be separated when the plastic has cooled, to remove the cushioned grab bar.

The polyvinyl chloride (PVC) is of a general purpose resin type with sufficient plasticizer mixed therewith to impart thereto the desired hardness, impact resistance or other mechanical properties. For example, the PVC may contain 3-10 phr (parts per hundred parts of resin)

of a phthalate plasticizer and sufficient bariumcadmium stabilizer to provide the desired molding properties. The PVC may also contain up to 100 phr of filler which may be a flame retardant (e.g., antimony oxide or boranes) or calcium carbonate. The PVC has a Durometer A hardness (ASTM D 2240 - 15 sec. delay) in the range 55-80 with 60-70 being a preferable range. Increased hardness will require an increased amount of stabilizer for molding purposes.

To injection mold the PVC described above requires a temperature, at the barrel of the injection molding device, in the range of about 300°-380° F for a Durometer A hardness in the range of 60-80.

As an alternative to injection molding the outer layer about the inner member, the polyvinyl chloride may be introduced into a mold as liquid polyvinyl chloride plastisol following which the mold is heated to solidify the polyvinyl chloride. However, this method of molding is slower than injection molding and hence less desirable.

When outer layer 41 is formed about tubular inner member 40 by injection molding or the like, the outer layer is integrally bonded to the inner tubular member sufficiently to maintain the two in the desired predetermined peripheral registry. To further improve the bond between the outer layer and the inner tubular member and to prevent the outer layer from being cut with a knife and then stripped off the inner tubular member by vandals, an adhesive bonding agent or primer may be applied to the metallic inner tubular member before the injection molding operation. Such an adhesive bonding agent is described at pages 10-11 of parent application Ser. No. 553,253 filed Dec. 16, 1974. This bonding agent is applied to inner tubular member 40 and baked on (e.g., at 350° F for 5 minutes) before the inner tubular member is placed within the injection casting mold. The bonding agent adheres very tenaciously to the metal inner tubular member, and the plastic outer layer adheres very tenaciously to the bonding agent.

To enhance the adherence of the bonding agent to inner tubular member 40, the tubular member, normally composed of steel, may be subjected to a conventional iron phosphating treatment in which the inner tubular member is dipped in or sprayed with a conventional iron phosphating solution to produce a coating of iron phosphate on the iron surface of inner tubular member 40.

The integral bond between resilient outer layer 41 and metallic tubular inner layer 40 forms a monolithic, metal-plastic laminate.

As noted above, the outer layer of resilient cushioning material should have certain specific properties. These include the necessary softness and resilience or "give" to absorb the impact of a seat occupant's head or other parts of the body, without injuring the seat occupant, sufficient impact resistance to withstand the impact described above, the ability to be injection or otherwise molded about the tubular inner member and the ability to form an integral bond with the inner tubular member during the molding or casting operation. A plastic which has these properties may be used as the outer layer of resilient cushioning material.

The foregoing detailed description has been given for clearness of understanding only, and no unnecessary limitations should be understood therefrom, as modifications will be obvious to those skilled in the art.

What is claimed is:

1. In a seat having a frame with a vertical, tubular side rail on each side of the seat back, said tubular side rail terminating at an open upper end defined by an edge, and a cushioned grab bar located above the top of said seat back, said cushioned grab bar comprising:
    a round, metal, tubular, rigid inner member shaped to a predetermined longitudinal configuration;
    an annular outer layer of resilient cushioning material enclosing said inner tubular member and extending substantially coextensively with said inner tubular member to an exposed end portion of said outer layer;
    a terminal part extending axially from said tubular member at each end of said grab bar, beyond the exposed end portion of said layer of resilient cushioning material and into the open upper end of said tubular side rail;
    and means for securing said terminal part within said tubular side rail;
    said outer layer of resilient cushioning material comprising means at said exposed end portion thereof for abutting and covering said edge of said open upper end on the tubular side rail.

2. In a seat as recited in claim 1 wherein:
    said seat frame includes a top back rail extending between said vertical side rails at their upper open ends;
    said seat comprises a rigid seat shell mounted on said frame;
    said rigid seat shell includes a back having a flange extending rearwardly from said shell back and overlying said top back rail of the seat frame;
    said back top flange having a portion thereof cut away to accommodate said grab bar;
    said cut away portion being defined by an edge;
    said end portion on the outer layer of resilient cushioning material on the grab bar being indented, relative to the remainder of said outer layer, to define an indentation at said end portion;
    at least part of said edge of said cut away portion on the flange being received in said indentation;
    said outer layer of resilient cushioning material comprising means overlying the edge of said cut away portion for covering at least a part of said edge.

3. In a seat as recited in claim 1 wherein:
    said annular outer layer of resilient cushioning material is molded around said inner tubular member; and
    said terminal part comprises a necked-down portion engageable to prevent axial movement by said inner tubular member.

4. In a passenger-carrying vehicle having at least a pair of seats arranged one behind the other, the front seat of said pair having a frame, a seat back, and a cushioned grab bar located above the top of said seat back, said cushioned grab bar comprising:
    a round, metal, tubular, rigid inner member shaped to a predetermined longitudinal configuration and having a pair of terminal parts;
    said tubular inner member having a longitudinally uniform, round cross-section between its terminal parts;
    said tubular inner member being unfilled and imperforate between its terminal parts;
    an annular outer layer of resilient cushioning material enclosing said inner tubular member and extending substantially coextensively with said inner tubular member;

a bonding agent comprising means integrally bonding said annular outer layer to said round, tubular inner member to form a monolithic laminate of metal and resilient cushioning material;

said integral bonding means comprising means for preventing the outer layer from being cut with a knife and then stripped away from the inner member;

said annular outer layer on the cushioned grab bar having an irregular cross-section varying in thickness;

said integral bonding means comprising means for maintaining said outer layer and said inner member in a predetermined registry in which the thickest parts of said outer layer are at those locations most susceptible to impact by a person sitting in a seat located directly behind the seat having said grab bar, during abrupt changes of movement of said vehicle, and the thinnest parts are at those locations least susceptible to said impact;

and means for securing said terminal end parts to said seat frame.

5. In a seat having a frame and a seat back, a cushioned grab bar located above the top of said seat back, said cushioned grab bar comprising:

a round, metal, tubular, rigid inner member shaped to a predetermined longitudinal configuration and having a pair of terminal parts;

said tubular inner member having a longitudinally uniform, round cross-section between its terminal parts;

said tubular inner member being unfilled and imperforate between its terminal parts;

an annular outer layer of resilient cushioning material enclosing said inner tubular member and extending substantially coextensively with said inner tubular member;

said annular outer layer being composed of plastic material capable of being injection molded;

said outer layer being molded around said inner tubular member;

a bonding agent comprising means integrally bonding said annular outer layer to said round, tubular inner member to form a monolithic laminate of metal and resilient cushioning material;

said integral bonding means comprising means for preventing the outer layer from being cut with a knife and then stripped away from the inner member;

and means for securing said terminal end parts to said seat frame.

6. In a seat as recited in claim 5 wherein said outer layer is composed of polyvinyl chloride.

* * * * *